(12) United States Patent
Spandley et al.

(10) Patent No.: US 12,338,790 B2
(45) Date of Patent: Jun. 24, 2025

(54) INSPECTING WIND TURBINE BLADE

(71) Applicant: Vestas Wind Systems A/S, Aarhus N. (DK)

(72) Inventors: Luke Spandley, Ventnor (GB); Darren Rogers, Bodmin (GB); Arran Wood, Cowes (GB); Paul Badger, Salisbury (GB)

(73) Assignee: Vestas Wind Systems A/S, Aarhus N. (DK)

( * ) Notice: Subject to any disclaimer, the term of this patent is extended or adjusted under 35 U.S.C. 154(b) by 212 days.

(21) Appl. No.: 17/629,526

(22) PCT Filed: Jul. 27, 2020

(86) PCT No.: PCT/DK2020/050219
§ 371 (c)(1),
(2) Date: Jan. 24, 2022

(87) PCT Pub. No.: WO2021/023350
PCT Pub. Date: Feb. 11, 2021

(65) Prior Publication Data
US 2022/0243703 A1    Aug. 4, 2022

(30) Foreign Application Priority Data
Aug. 2, 2019  (DK) .......................... PA 2019 70493

(51) Int. Cl.
*F03D 17/00*   (2016.01)
*G01M 5/00*   (2006.01)

(52) U.S. Cl.
CPC .......... *F03D 17/00* (2016.05); *G01M 5/0016* (2013.01); *G01M 5/0091* (2013.01); *F05B 2260/80* (2013.01)

(58) Field of Classification Search
CPC ........ F03D 17/00; F03D 80/60; F03D 1/0675; F03D 1/0633; F03D 1/06; G01M 5/0016;
(Continued)

(56) References Cited

U.S. PATENT DOCUMENTS

| 7,109,700 B2 * | 9/2006 | Fazzina ................ G01R 15/125 |
| | | 324/754.02 |
| 7,988,415 B2 * | 8/2011 | Hardison ............... H02G 13/00 |
| | | 416/61 |

(Continued)

FOREIGN PATENT DOCUMENTS

| CA | 3066694 A1 | 1/2019 |
| CN | 105673361 A | 6/2016 |

(Continued)

OTHER PUBLICATIONS

Danish Patent and Trademark Office, Search and Examination Report in PA 2019 70493, Jan. 30, 2020.
(Continued)

*Primary Examiner* — Huy Q Phan
*Assistant Examiner* — Martin Walter Braunlich
(74) *Attorney, Agent, or Firm* — Wood Herron & Evans LLP

(57) ABSTRACT

A method of inspecting a wind turbine blade having an electro-thermal heating element and a surface protection layer. The method includes: exposing a test point of the electro-thermal heating element; contacting the test point to establish an electrical connection between the test point and a sensor; and electrically connecting the sensor to the surface protection layer. The sensor is operated to measure a resistance value indicative of an electrical resistance between the test point and the surface protection layer. The resistance value is analysed to determine a condition of the wind turbine blade. The invention provides a method of (Continued)

inspecting a wind turbine blade which enables damage or defects to be detected which may be difficult to detect by visual inspection or traditional non-destructive testing techniques.

16 Claims, 5 Drawing Sheets

(58) Field of Classification Search
CPC .............. G01M 5/0091; F05B 2260/20; F05B 2260/80; F05B 2270/331; G01L 1/20; G01L 1/22; G01N 17/00; G01N 27/02; G01N 27/04; G01R 27/00
See application file for complete search history.

(56) References Cited

U.S. PATENT DOCUMENTS

| | | | | |
|---|---|---|---|---|
| 9,046,566 | B2* | 6/2015 | Jakobsen | G01R 31/58 |
| 10,669,996 | B2* | 6/2020 | Whitehouse | F03D 1/0675 |
| 11,174,846 | B2* | 11/2021 | Martin | B32B 38/1808 |
| 2015/0204311 | A1* | 7/2015 | Clemens | F03D 80/30 |
| | | | | 219/539 |
| 2021/0151975 | A1* | 5/2021 | Wood | G01R 31/3277 |

FOREIGN PATENT DOCUMENTS

| | | | | |
|---|---|---|---|---|
| CN | 107120243 | A | 9/2017 | |
| CN | 207064138 | U | 3/2018 | |
| CN | 107882697 | A | 4/2018 | |
| EP | 0913695 | A2 | 5/1999 | |
| WO | 2004055366 | A1 | 7/2004 | |
| WO | WO-2017167347 | A1 * | 10/2017 | ............ F03D 17/00 |
| WO | 2019001657 | A1 | 1/2019 | |

OTHER PUBLICATIONS

European Patent Office, International Search Report and Written Opinion in PCT Application No. PCT/DK2020/050219, Nov. 10, 2020.

* cited by examiner

Busbar No.

Busbar No.

INSPECTING WIND TURBINE BLADE

FIELD OF THE INVENTION

The present invention relates to a wind turbine blade with an electro-thermal heating element, and a method of inspecting such a wind turbine blade.

BACKGROUND OF THE INVENTION

An electro-thermal heating element for a wind turbine blade is disclosed in WO 2019/001657. The heating element comprises an electrically conductive resistive material; two active busbars for supplying electrical power to the electrically conductive resistive material; and at least one dummy busbar at a predetermined spacing between the two active busbars on the electrically conductive resistive material.

SUMMARY OF THE INVENTION

A first aspect of the invention provides a method of inspecting a wind turbine blade, the wind turbine blade comprising an electro-thermal heating element and a surface protection layer, the method comprising: exposing a test point of the electro-thermal heating element; contacting the test point to establish an electrical connection between the test point and a sensor; electrically connecting the sensor to the surface protection layer; operating the sensor to measure a resistance value indicative of an electrical resistance between the test point and the surface protection layer; and analysing the resistance value to determine a condition of the wind turbine blade.

The invention provides a method of inspecting a wind turbine blade which enables damage or defects to be detected which may be difficult to detect by visual inspection or traditional non-destructive testing techniques. For instance, the resistance value may give an indication of the presence of an electrical short between the heating element and the surface protection layer.

Optionally only a single resistance value may be obtained from a single test point. In this case the resistance value may be compared with a threshold to indicate the presence or absence of an electrical short. Alternatively, the method may comprise: exposing a plurality of test points of the electro-thermal heating element; contacting the test points to establish electrical connections between the test points and the sensor; and operating the sensor to measure a plurality of resistance values, each resistance value indicative of an electrical resistance between a respective one of the test points and the surface protection layer; and analysing the resistance values to determine the condition of the wind turbine blade. The analysis of the resistance values may indicate an approximate location of a suspected electrical short, for example.

The sensor may comprise a measurement probe, and the electrical connections may be established by contacting the test points one after the other with the measurement probe. Alternatively, the sensor may have multiple measurement probes which are used to simultaneously establish the electrical connections.

The condition of the wind turbine blade may comprise an estimated fault location which is estimated based on the analysis of the resistance value(s) and the location(s) of the test points.

Optionally analysing the resistance values comprises identifying one or more lowest ones of the resistance values, and the condition of the wind turbine blade comprises an estimated fault location which is estimated based on the location(s) of the test point(s) associated with the lowest one(s) of the resistance values.

The wind turbine blade may comprise an electrically grounded network, and the electrically grounded network may comprise the surface protection layer and one or more sub-components. The sensor may be electrically connected to the surface protection layer by contacting the surface protection layer, or one of the sub-components, with a reference probe.

The electro-thermal heating element may comprise an electro-thermal heating mat.

The electro-thermal heating mat may be made of an electrically conductive resistive material, such as a carbon fibre veil material.

The surface protection layer may comprise a perforated foil, a grid or a mesh.

Analysing the resistance value(s) to determine a condition of the wind turbine blade may comprise analysing the resistance value(s) to detect the presence or absence of an electrical short circuit between the electro-thermal heating element and the surface protection layer.

The surface protection layer may be a lightning-strike protection layer.

The surface protection layer may be metallic, for instance copper or aluminium.

The electro-thermal heating element may comprise one or more busbars, wherein the (or each) test point is located on a respective one of the busbars.

The (or each) busbar may comprise a connection pad on the busbar, wherein at least one of the test points is located on a respective one of the connection pads on a respective one of the busbars.

The sensor may comprise a measurement probe, and the (or each) electrical connection may be established by contacting a respective test point with the measurement probe.

The wind turbine blade may further comprise an insulating layer between the electro-thermal heating element and the surface protection layer. The insulating layer may be made of any suitable electrically insulating material, such as a glass fibre composite material.

The test point of the electro-thermal heating element may be exposed by removing blade material, such as a part of the insulating layer and a part of the surface protection layer. If there are multiple test points, then each test point may be exposed by removing a respective part of the insulating layer and a respective part of the surface protection layer.

The parts of the insulating layer and the surface protection layer may be removed by grinding.

The wind turbine blade may be repaired by replacing the removed parts of the insulating layer and the surface protection layer with repair patches.

A further aspect of the invention provides a method of inspecting and repairing a wind turbine blade, the method comprising inspecting the wind turbine blade by the method of the first aspect, wherein the analysis of the resistance value(s) generates an estimated fault location of the wind turbine blade; and replacing a portion of the electro-thermal heating element at the estimated fault location.

The wind turbine blade may further comprise an insulating layer between the electro-thermal heating element and the surface protection layer.

The method may further comprise replacing portions of the electro-thermal heating element, the surface protection layer and the insulating layer at the estimated fault location.

The electro-thermal heating element may comprise two or more busbars including an adjacent pair of the busbars, wherein the estimated fault location is between the pair of the busbars, and all of the electro-thermal heating element between the pair of busbars is replaced.

A second aspect of the invention provides a wind turbine blade comprising an electro-thermal heating element; and a surface protection layer, wherein the electro-thermal heating element comprises: an electro-thermal heating mat; two active busbars on the electro-thermal heating mat for supplying electrical power to the electro-thermal heating mat, at least one dummy busbar on the electro-thermal heating mat between the two active busbars, and a connection pad on each active busbar and on each dummy busbar.

The connection pads may be on a side of the busbar opposite the surface protection layer, or on the same side of the busbar as the surface protection layer.

The connection pads may be copper or any other conductive material.

Each connection pad may have a thickness greater than the busbar which carries it.

The electro-thermal heating mat may made of an electrically conductive resistive material, such as a carbon fibre veil material.

The surface protection layer may be made of an electrically conductive material. For instance, the surface protection layer may be metallic.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
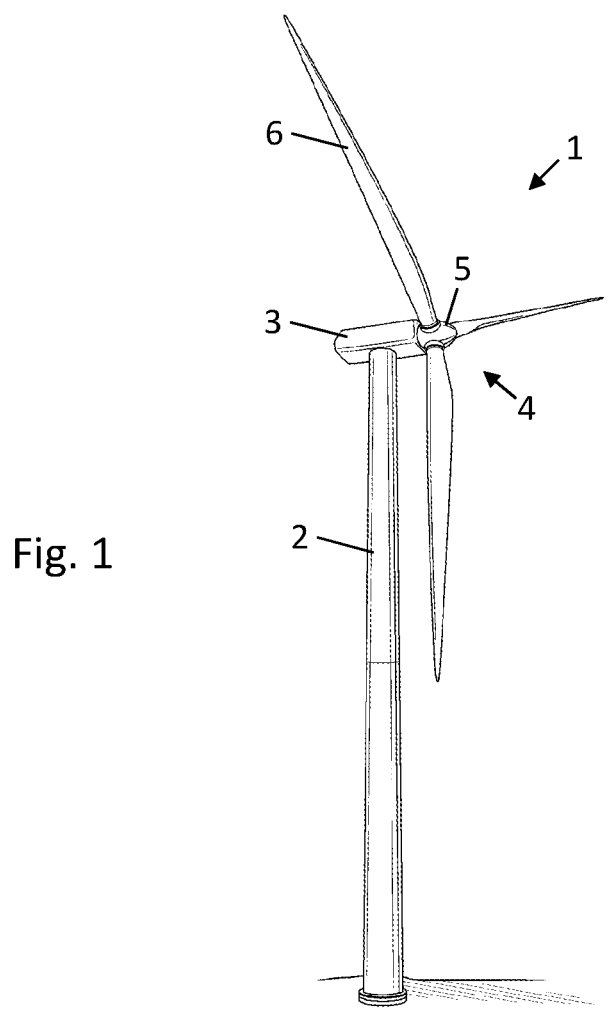
FIG. 1 shows a wind turbine.

FIG. 1 shows a wind turbine 1. The wind turbine 1 has a tower 2 and a nacelle 3 at the top of the tower 2. A wind turbine rotor 4 is connected to the nacelle 3 and arranged to rotate relative to the nacelle 3. The wind turbine rotor 4 comprises a wind turbine hub 5, and multiple wind turbines blades 6 extending from the hub 18. While a wind turbine rotor 4 having three blades 4 is shown, a different number of blades, such as two or four, may be used.

Figure 2:
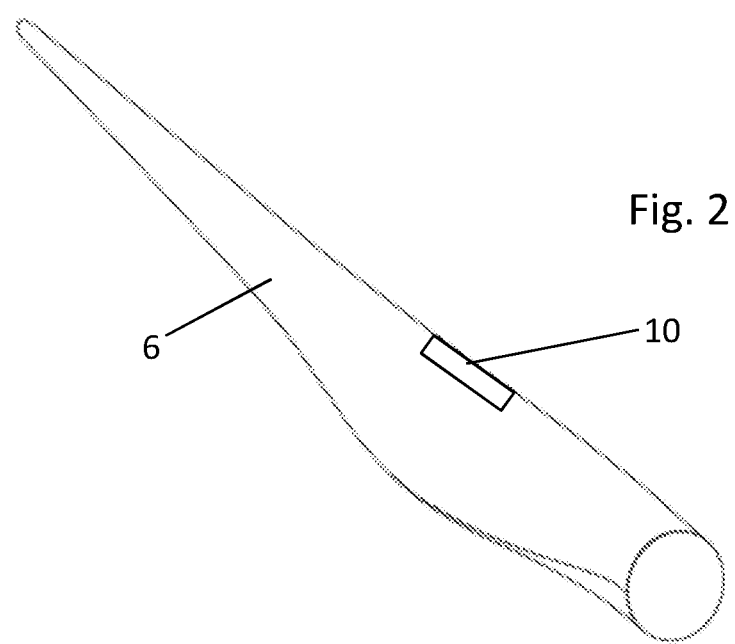
FIG. 2 shows a wind turbine blade with an electro-thermal heating element.

Each blade 6 has a row of electro-thermal heating elements embedded along its leading edge. The heating elements may be used for either or both of anti-icing (preventing ice accumulating) or de-icing (removing accumulated ice) of the blade 6. FIG. 2 shows a single one of such heating elements 10, the other heating elements being omitted from FIG. 2.

Figure 3:
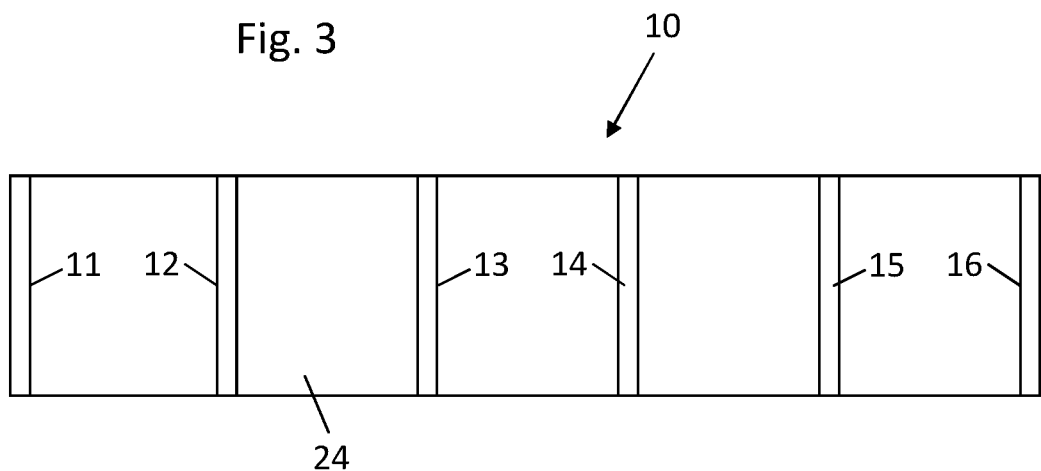
FIG. 3 shows the electro-thermal heating element.
Figure 4:
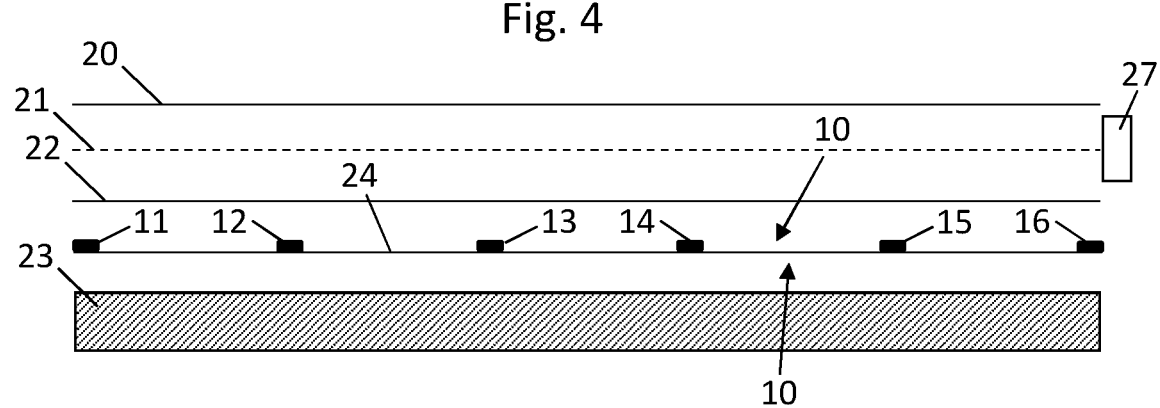
FIG. 4 is a cross-sectional view through part of the blade.

As shown in FIGS. 3 and 4, the heating element 10 comprises an electro-thermal heating mat 24 made of an electrically conductive resistive material and may have one or more copper busbars 11-16 on the mat 24, spaced apart along its length. The spacing between the busbars is typically of the order of 500 mm.

The mat 24 has a sheet resistance chosen such that when a voltage is applied between the busbars 11, 16 at each end, the mat produces heat at a desired heat flux due to resistive or ohmic heating.

The mat 24 may comprise a carbon fibre veil, a carbon/glass fibre veil, or a metallic mesh, for example.

The heating element 10 may have a length of the order of 8 m, and a width of the order of 0.7 m, for example. Only six busbars are shown in FIG. 3, but a larger number may be used in practice. For instance, if the length is 8 m and the spacing is 500 mm, then there will be seventeen busbars.

The busbars 11, 16 at each end are "active" busbars (in that they are used to apply a voltage along the full length of the heating element) whereas the other busbars 12-15 are "dummy" busbars which enable repair to be achieved in a more effective manner, as described in WO2019/001657, the contents of which are incorporated herein by reference.

FIG. 4 is a cross-sectional view through the blade at the location of the heating element 10. The main structure is a blade laminate 23, which may comprise a laminar composite material for example. The blade also has a surface protection layer 21; and an insulating layer 22 between the electro-thermal heating element 10 and the surface protection layer 21.

The wind turbine blade comprises an electrically grounded network, the electrically grounded network comprising the surface protection layer 21 and one or more other sub-components such as a metal blade tip, a cable at the root of the blade, or a carbon spar cap. One of these sub-components is indicated schematically at 27 in FIGS. 4 and 5.

The surface protection layer 21 is made of a metallic material such as aluminium or copper. The purpose of the surface protection layer 21 is to protect the heating element 10 and the blade laminate 23 if the blade is struck by lightning. In the event of a lightning strike, the surface protection layer 21 conducts electrical currents to ground via other sub-components of the electrically grounded network. Thus, the surface protection layer 21 acts as a lightning-strike protection layer. The surface protection layer 21 typically comprises a perforated foil, an expanded foil, a grid or a mesh. In a preferred example the surface protection layer 21 comprises an aluminium expanded foil.

The insulating layer 22 may comprise one or more plies of glass-fibre composite material (for example glass fibre impregnated with a resin). The purpose of the insulating layer 22 is to electrically isolate the heating element 10 from the surface protection layer 21.

The blade 6 may also have a surface coating 20 at its outer surface. The surface coating 20 may comprise a gel coat, or a paint layer for example.

Figure 5:
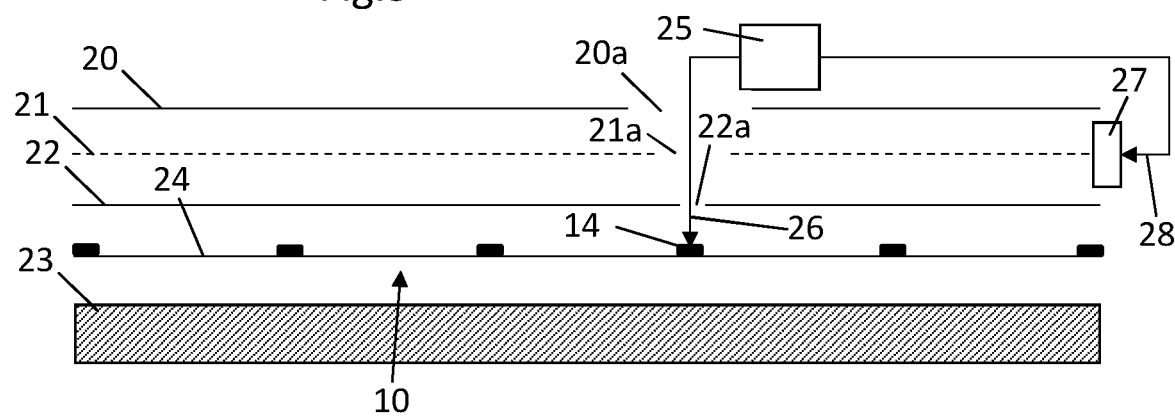
FIG. 5 shows a sensor connected to the surface protection layer and electrically grounded network.

A method of inspecting the wind turbine blade is shown in FIG. 5.

First, a test point of the electro-thermal heating element 10 is exposed. In this example the test point is located on one of the busbars 14, and it is exposed by removing a part of the surface coating 20 to leave a hole 20a, then a part of the surface protection layer 21 to leave a hole 21a, and then a part of the insulating layer 22 to leave a hole 22a. The parts may be removed by grinding with a small ball ended grinder, for example. In this example the holes 20a, 21a, 22a have progressively reducing diameters.

If a test point is not covered by the insulating layer and the surface protection layer, then that test point may be exposed by removing whatever other blade material is covering it.

A sensor 25, such as a digital multi-meter, is provided with a measurement probe 26 and a reference probe 28. An electrical connection with the test point on the busbar 14 is established by passing the measurement probe 26 through the pre-formed holes 20a, 21a, 22a, and then contacting the test point (in this case by contacting the busbar 14).

The sensor 25 may be electrically connected to the surface protection layer 21 by contacting the surface protection layer 21, or one of the other sub-components of the electrically grounded network, with the reference probe 28. In this example, the reference probe 28 contacts the sub-component 27, which may be the metal blade tip for example. The reference probe 28 may comprise a "crocodile clip" which attaches it to the metal blade tip, for example.

Once the electrical connections have been established as shown in FIG. 5, the sensor 25 is operated to measure a resistance value between the probes 26, 28, which is indicative of an electrical resistance between the busbar 14 and the surface protection layer 21.

If the blade is not damaged or otherwise faulty, then the resistance value will be very high, essentially infinite, due to the very high electrical resistance of the insulating layer 22. If the blade is faulty (for instance due to damage from a lightning strike, damage to the blade surface, or a manufacturing fault) then this can cause an electrical short between the heating element 10 and the surface protection layer 21. Such shorts can be small and difficult to find by visual inspection or traditional non-destructive testing techniques.

An electrical short will cause the resistance value to decrease. If the fault location (i.e. the location of the electrical short) is close to the busbar 14 then the resistance will be very low, but if the fault location is remote from the busbar 14 (for instance at the left-hand end busbar 11) then the resistance will be higher, but still much lower than in the non-faulty case.

Thus, the resistance value can be analysed to determine a condition of the wind turbine blade. In the most basic case, the analysis may simply compare the resistance value with a threshold to detect the presence or absence of an electrical short between the electro-thermal heating element 10 and the surface protection layer 21. If the resistance value is higher than the threshold, then the blade is determined to be in a non-faulty condition; if it is lower, then the blade is determined to be in a faulty condition.

Figure 6:
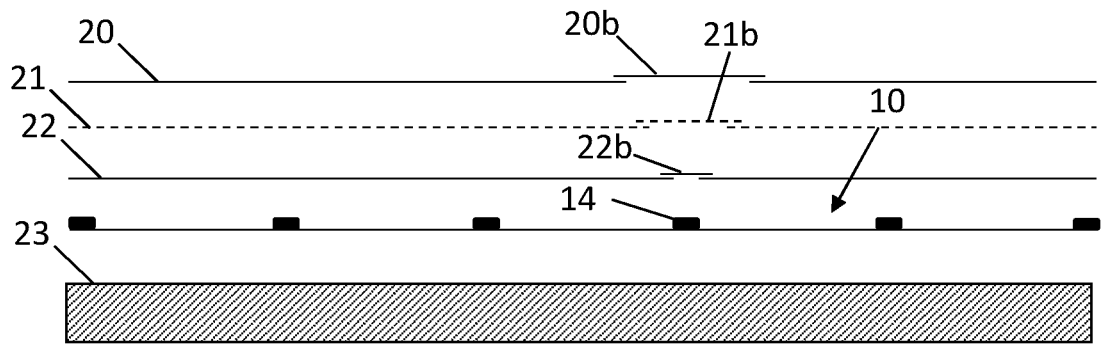
FIG. 6 is a cross-sectional view corresponding with FIG. 4 after the blade has been tested and repaired.

If the blade is determined to be in a non-faulty condition, then the blade is repaired by replacing the removed parts of the surface coating 20, the surface protection layer 21 and the insulating layer 22 with gel or paint 20b and repair patches 21b, 22b shown in FIG. 6. The repair patch 22b may be laid up as a dry glass fibre ply which is subsequently infused with resin, or it may be applied as a prepreg (glass fibre pre-impregnated with resin) which is then cured.

If the blade is determined to be in a faulty condition based on only a single resistance value, then the fault location can only be crudely estimated. Therefore, in a preferred method, a plurality of test points of the electro-thermal heating element 10 are exposed and then tested in order to more accurately estimate the fault location.

In this preferred method, the test points may be contacted one after the other with the measurement probe 26 to establish electrical connections between the test points and the sensor. Alternatively, the sensor may have plural measurement probes 26, each contacting a respective one of the test points.

The sensor is operated to measure a plurality of resistance values, each resistance value indicative of an electrical resistance between a respective one of the test points and the surface protection layer 21. The reference sensor 28 remains connected to the electrically grounded network during this process.

Figure 7:
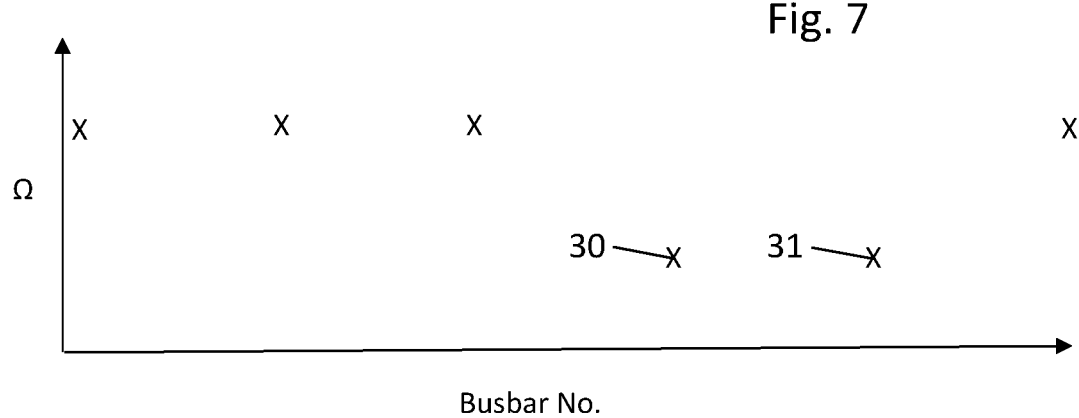
FIG. 7 shows six resistance values.

Six resistance values are indicated by crosses in FIG. 7, each corresponding with a respective one of the busbars 11-16. The resistance values are analysed to identify one or more lowest ones of the resistance values. In this case the two lowest resistance values 30, 31 are identified. The fault location is then estimated based on the locations of the adjacent pair of busbars 14, 15 associated with these two resistance values 30, 31. The resistance values 30, 31 are quite similar so the fault location is estimated to be mid-way between the two busbars 14, 15.

Alternatively, there may be a single resistance value which is much lower than all of the others. In this case, the fault location is estimated to be on, or close to, the busbar associated with that resistance value.

Once the fault location has been estimated as described above, the blade may be repaired as shown in FIG. 8. First, a larger area of the electro-thermal heating element is exposed by enlarging the holes 20a, 21a, 22a, by grinding for example. Next a portion of the electro-thermal heating element at the estimated fault location is repaired. In this case, the estimated fault location is between the two adjacent busbars 14, 15, so all of the carbon fibre veil mat 24 between the busbars 14, 15 is removed (for instance by grinding) and replaced by a carbon fibre veil repair patch 24a. The repair patch 24a has inward facing copper busbars 14a, 15a which contact the outward facing busbars 14, 15.

Figure 8:
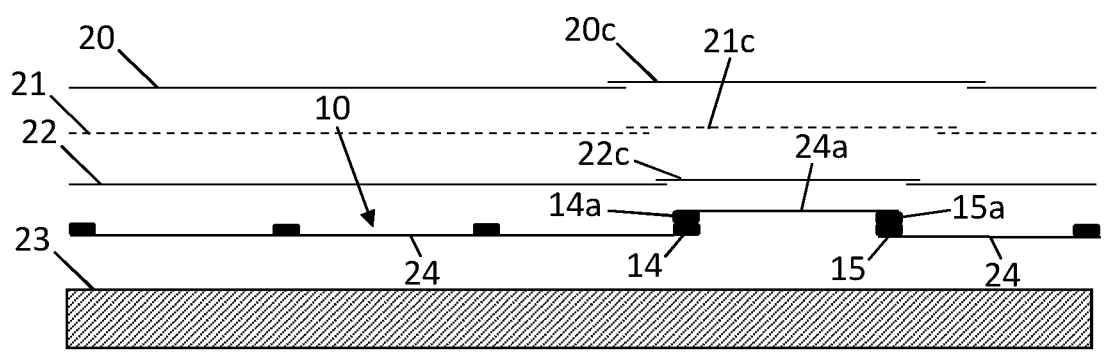
FIG. 8 is a cross-sectional view corresponding with FIG. 4 after the blade has been tested and the electro-thermal heating element has been repaired.

The repair is then completed by replacing the removed portions of the surface coating 20, the surface protection layer 21 and the insulating layer 22 with gel or paint 20c and repair patches 21c, 22c shown in FIG. 8. The repair patch 22c may be laid up as a dry glass fibre ply which is subsequently infused with resin, or it may be applied as a prepreg (glass fibre pre-impregnated with resin) which is then cured.

Figure 9:
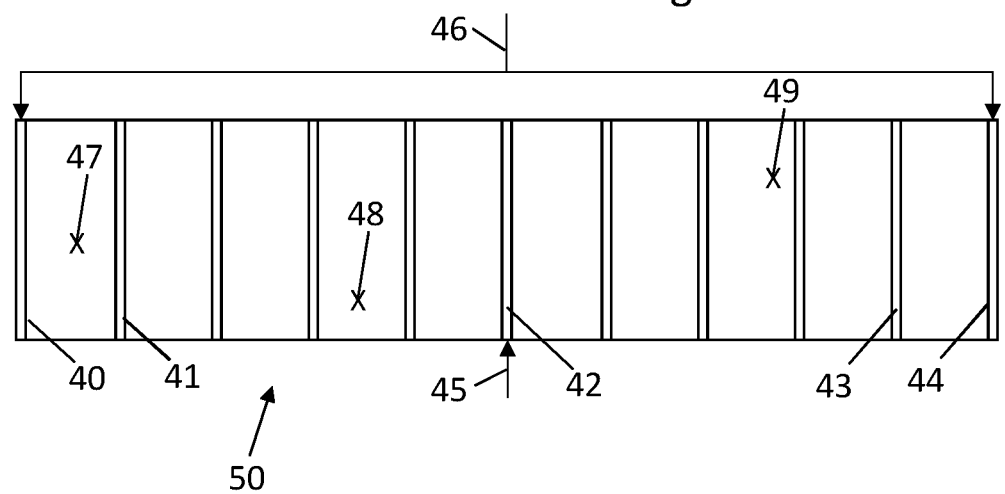
FIG. 9 shows an alternative electro-thermal heating element.

The example above assumes that a voltage difference is applied between the busbars 11, 16 at each end, so in this case the lowest resistance values unambiguously identify the fault location. FIG. 9 shows an alternative arrangement. In this case, the same voltage is applied to busbars 40, 44 at each end via a high voltage line 46, and a central busbar 42 is connected to neutral voltage via a neutral connection 45.

The blade is damaged at three locations 47-49. The damage is greatest at the location 47, and least at the location 49. In a first testing step a first series of eleven resistance values is measured, each value corresponding to a respective one of the busbars. This series is indicated by the lower line in FIG. 10 and has three low points. Two of the low points 47a are associated with the adjacent pair of busbars 40, 41 on either side of the fault location 47. The third low point 47b is associated with the busbar 44 at the opposite end of the heating element. The low points 47a are slightly below the low point 47b, so the heating element is repaired between the busbars 40, 41.

Before the blade is fully repaired, in a second testing step a second series of eleven resistance values is measured, each value corresponding to a respective one of the busbars. This series is indicated by the middle line in FIG. 10 and has two low points 48a associated with the adjacent pair of busbars on either side of the fault location 48, so the heating element is repaired between these busbars. Note that the average resistance is higher than for the first series.

In a third testing step a third series of eleven resistance values is measured, each value corresponding to a respective one of the busbars. This series is indicated by the top line in FIG. 10 and has two low points 49a associated with the adjacent pair of busbars on either side of the fault location 49, so the heating element is repaired between these busbars. Note that the average resistance is higher than for the first and second series.

In a fourth testing step a single resistance value is measured which indicates a very high or infinite resistance, since all of the necessary repairs to the heating element 10 have now been made. Repair patches and gel/paint are then applied to complete the repair.

Figure 11:
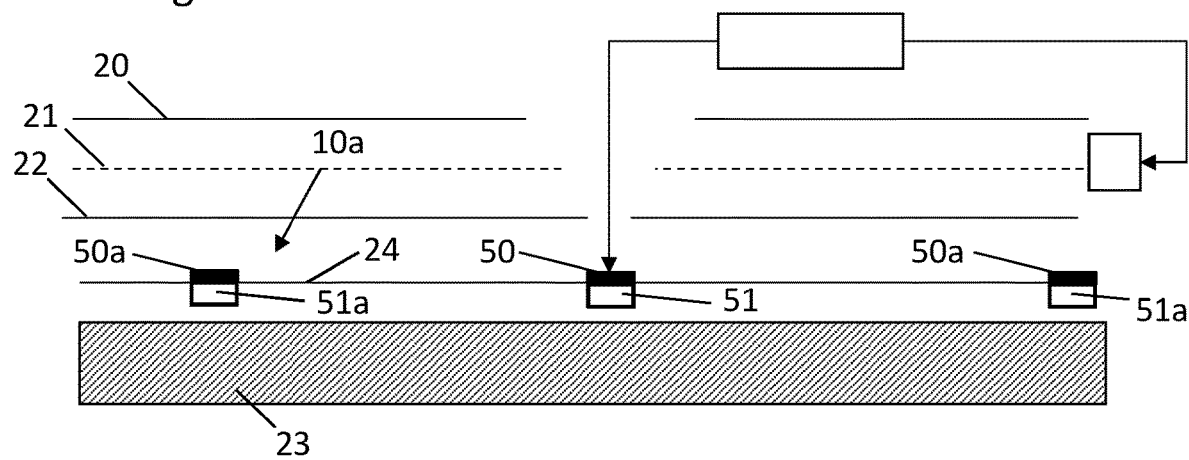
FIG. 11 is a cross-sectional view through part of an alternative blade.

FIG. 11 is a cross-sectional view through a wind turbine blade according to an embodiment of the invention. The wind turbine blade has many features in common with the wind turbine blade of FIGS. 1-8 and the same reference numbers are used for equivalent components. The blade has a blade laminate 23, an electro-thermal heating element 10a, a surface protection layer 21; an insulating layer 22 between the electro-thermal heating element 10a and the surface protection layer 21; and a surface coating 20.

Figure 10:
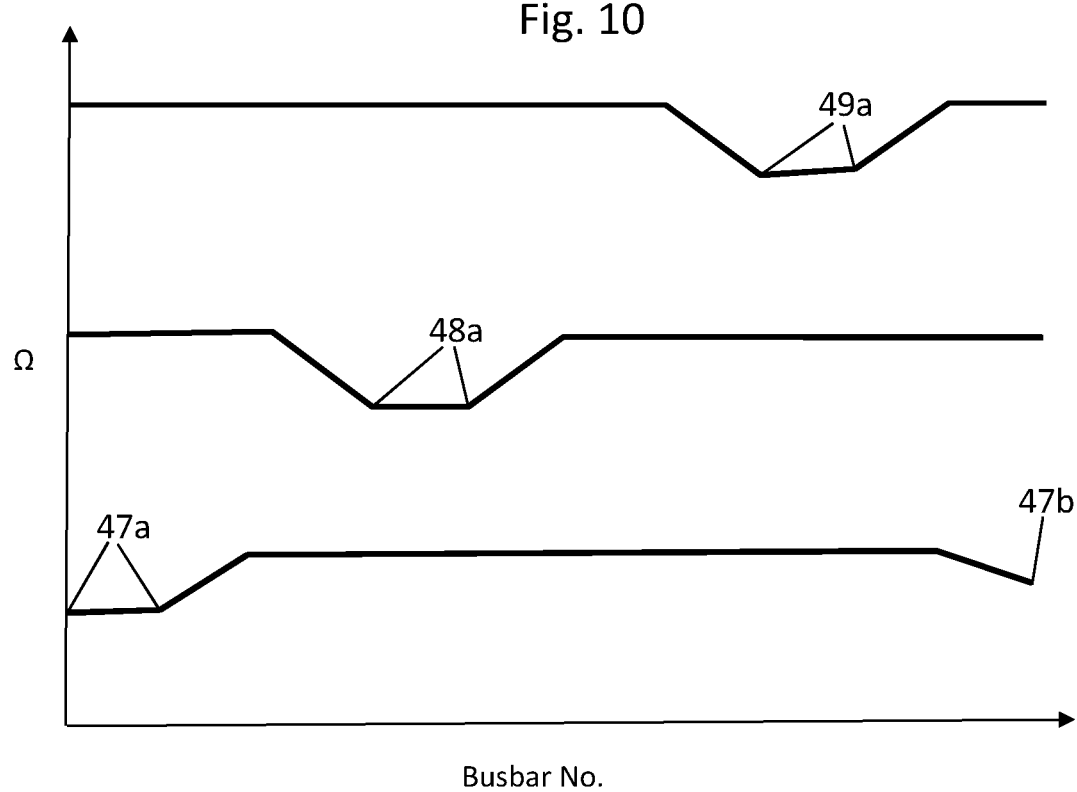
FIG. 10 shows three series of resistance values taken from the element of FIG. 9.

The electro-thermal heating element 10a comprises: an electro-thermal heating mat 24; two active busbars 50a on the electro-thermal heating mat 24 for supplying electrical power to the electro-thermal heating mat 24, and a dummy busbar 50 on the electro-thermal heating mat between the two active busbars 50a. In this case only a single dummy busbar 50 is shown for ease of illustration, but the number will typically be greater as shown in FIGS. 3 and 10 for example.

A connection pad 51a is provided on the underside of each active busbar 50a, and a connection pad 51 is provided on the underside of each dummy busbar 50. The connection pads 51, 51a may be made of the same material as the busbars 50, 50a which carry them (for instance copper) or another conductive material. The connection pads 51, 51a are electrically connected to the busbars 50, 50a which carry them.

The busbars 50, 50a are very thin, and the connection pads 51, 51a are much thicker than the busbars (note that FIG. 11 is not to scale). Each connection pad may have a thickness no greater than 2 mm.

The connection pads 51, 51a ensure that when the blade is ground down to make a connection with the busbar, as shown in FIG. 11 for the dummy busbar 50, the busbar is not ground away due to the connection pads.

In this example the connection pads 51, 51a are on the undersides of the busbars (that is, the side opposite the surface protection layer 21), but they may also be on the top of the busbars (that is, on the same side as the surface protection layer 21).

Figure 12:
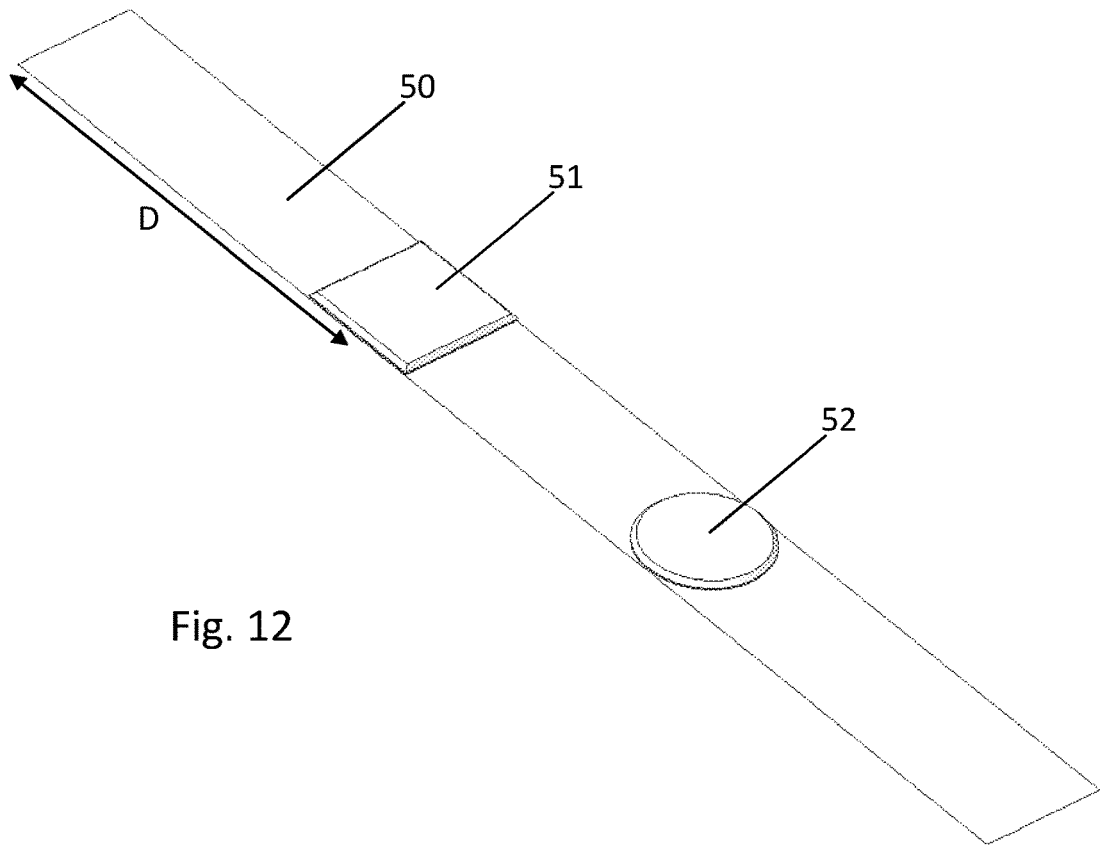
FIG. 12 shows a busbar with a pair of connection pads.

FIG. 12 shows the shape and position of the connection pad 51 on the dummy busbar. In this case the connection pad 51 is square and positioned by a known distance D from the end of the busbar so that it is at a known location relative to the leading edge of the blade. The connection pads 51a on the active busbars are similar and positioned at the same point along the length of their respective busbars.

FIG. 12 also shows a connection pad 52 with an alternative (circular) shape. Note that this is for illustrative purposes only: each busbar has only a single connection pad.

Although the invention has been described above with reference to one or more preferred embodiments, it will be appreciated that various changes or modifications may be made without departing from the scope of the invention as defined in the appended claims.

The invention claimed is:

1. A method of inspecting a wind turbine blade, the wind turbine blade comprising an electro-thermal heating element and a surface protection layer, the method comprising:
   exposing a test point of the electro-thermal heating element by removing material of the wind turbine blade to form a hole from the surface of the blade to the test point;
   contacting the test point to establish an electrical connection between the test point and a sensor;
   electrically connecting the sensor to the surface protection layer;
   operating the sensor to measure a resistance value indicative of an electrical resistance between the test point and the surface protection layer; and
   analysing the resistance value to determine a condition of the wind turbine blade.

2. The method according to claim 1, the method comprising:
   exposing a plurality of test points of the electro-thermal heating element;
   contacting the test points to establish electrical connections between the test points and the sensor;
   operating the sensor to measure a plurality of resistance values, each resistance value indicative of an electrical resistance between a respective one of the test points and the surface protection layer; and
   analysing the resistance values to determine the condition of the wind turbine blade.

3. The method according to claim 2, wherein the sensor comprises a measurement probe, and the electrical connections are established by contacting the test points one after the other with the measurement probe.

4. The method according to claim 2, wherein the condition of the wind turbine blade comprises an estimated fault location which is estimated based on the analysis of the resistance values and the locations of the test points.

5. The method according to claim 2, wherein analysing the resistance values comprises identifying one or more lowest ones of the resistance values, and the condition of the wind turbine blade comprises an estimated fault location which is estimated based on the location(s) of the test point(s) associated with the lowest one(s) of the resistance values.

6. The method according to claim 1, wherein the wind turbine blade comprises:
   an electrically grounded network, the electrically grounded network comprising the surface protection layer and one or more sub-components; and
   the sensor is electrically connected to the surface protection layer by contacting the surface protection layer or one of the sub-components with a reference probe.

7. The method according to claim 6, wherein the sensor is electrically connected to the surface protection layer by contacting one of the sub-components with a reference probe.

8. The method according to claim 1, wherein the sensor is electrically connected to the surface protection layer by contacting the surface protection layer with a reference probe.

9. The method according to claim 1, wherein the electro-thermal heating element comprises an electro-thermal heating mat.

10. The method according to claim 1, wherein the surface protection layer comprises a perforated foil, a grid or a mesh.

11. The method according to claim 1, wherein analysing the resistance value(s) to determine a condition of the wind turbine blade comprises analysing the resistance value(s) to detect the presence or absence of an electrical short circuit between the electro-thermal heating element and the surface protection layer.

12. The method according to claim 1, wherein the surface protection layer is a lightning-strike protection layer.

13. The method according to claim 1, wherein the surface protection layer is metallic.

14. The method according to claim 1, wherein the electro-thermal heating element comprises one or more busbars, and each test point is located on a respective one of the busbars.

15. The method according to claim 1, wherein the sensor comprises a measurement probe, and each electrical connection is established by contacting a respective test point with the measurement probe.

16. The method according to claim 1, wherein the wind turbine blade further comprises:
- an insulating layer between the electro-thermal heating element and the surface protection layer; and
- wherein the test point of the electro-thermal heating element is exposed by removing a part of the insulating layer and a part of the surface protection layer, or each test point is exposed by removing a respective part of the insulating layer and a respective part of the surface protection layer.

* * * * *